(12) United States Patent
Guo et al.

(10) Patent No.: US 12,534,629 B2
(45) Date of Patent: Jan. 27, 2026

(54) SPRAY-APPLIED POLYURETHANE INSULATION MATERIAL FOR TUNNELS IN COLD REGIONS, ITS APPLICATION, AND ITS CONSTRUCTION METHOD

(71) Applicants: CHINA ACADEMY OF RAILWAY SCIENCES CORPORATION LIMITED, Beijing (CN); RAILWAY ENGINEERING RESEARCH INSTITUTE, CHINA ACADEMY OF RAILWAY SCIENCES CORPORATION LIMITED, Beijing (CN)

(72) Inventors: Xiaoxiong Guo, Beijing (CN); Weibin Ma, Beijing (CN); Quanxiao Dong, Hebei (CN); Zefu Zheng, Beijing (CN); Peng Qiu, Hebei (CN); Tianyuan Xu, Beijing (CN); Chi Luo, Beijing (CN); Cheng Qiu, Hebei (CN); Peng Zhao, Beijing (CN); Yao Li, Beijing (CN); Zheli An, Beijing (CN); Xingxu Bao, Hebei (CN); Simeng Yan, Hebei (CN); Xueliang Cui, Hebei (CN); Xuehuan Hu, Hebei (CN); Yitong Shen, Hebei (CN); Tiantian Song, Hebei (CN); Weihua Zhang, Hebei (CN); Kuan Liu, Hebei (CN)

(73) Assignees: CHINA ACADEMY OF RAILWAY SCIENCES CORPORATION LIMITED, Beijing (CN); RAILWAY ENGINEERING RESEARCH INSTITUTE, CHINA ACADEMY OF RAILWAY SCIENCES CORPORATION LIMITED, Beijing (CN)

(*) Notice: Subject to any disclaimer, the term of this patent is extended or adjusted under 35 U.S.C. 154(b) by 0 days.

(21) Appl. No.: 18/857,179

(22) PCT Filed: Mar. 5, 2024

(86) PCT No.: PCT/CN2024/080096
§ 371 (c)(1),
(2) Date: Oct. 16, 2024

(87) PCT Pub. No.: WO2024/198853
PCT Pub. Date: Oct. 3, 2024

(65) Prior Publication Data
US 2025/0171646 A1    May 29, 2025

(30) Foreign Application Priority Data
Mar. 24, 2023   (CN) .......................... 202310297243.5

(51) Int. Cl.
*E21D 11/38* (2006.01)
*C09D 5/18* (2006.01)
(Continued)

(52) U.S. Cl.
CPC ................. *C09D 5/18* (2013.01); *C09D 7/45* (2018.01); *C09D 7/63* (2018.01); *C09D 7/65* (2018.01); *C09D 175/08* (2013.01); *E21D 11/38* (2013.01)

(58) Field of Classification Search
CPC ........... E21D 11/38; E21D 11/10; C09D 5/18; C09D 7/65; C09D 7/45; C09D 7/63; C09D 175/08; C09D 175/04
See application file for complete search history.

(56) References Cited

U.S. PATENT DOCUMENTS 2,602,299 A * 7/1952 Sonderegger ............. E02B 9/06
405/150.2
3,545,213 A * 12/1970 Hofbauer ................ E21D 11/10
52/249

(Continued)

FOREIGN PATENT DOCUMENTS

CN    103694434 A     4/2014
CN    107022142 A  *  8/2017  ........... C08G 77/045
(Continued)

OTHER PUBLICATIONS

CN 115536801 A translation. (Year: 2022).*
(Continued)

*Primary Examiner* — Carib A Oquendo (57) ABSTRACT

The present invention provides a spray-applied polyurethane insulation material for tunnels in cold regions, its applica-
(Continued)

tion, and its construction method. The spray-applied polyurethane insulation material for tunnels in cold regions is composed of raw materials with a mass ratio of 0.8-1.2 of material A and material B. By mass parts, material A includes 90-100 parts of polyether polyol, 90-100 parts of polyester polyol, 5-10 parts of chain extender, 1-4 parts of catalyst, 10-20 parts of flame retardant, 0.5-3 parts of water, and 1-3 parts of surfactant. The B component is diphenylmethane diisocyanate. The flame retardant is composed of flame retardant A and flame retardant B in a mass ratio of 10:1-2.5. The spray-applied polyurethane insulation material of the present invention is used to construct tunnel structures in cold regions, providing good flame retardant and insulation effects.

9 Claims, 6 Drawing Sheets

(51) Int. Cl.
*C09D 7/45* (2018.01)
*C09D 7/63* (2018.01)
*C09D 7/65* (2018.01)
*C09D 175/08* (2006.01)

(56) References Cited

U.S. PATENT DOCUMENTS

| | | | | |
|---|---|---|---|---|
| 6,761,504 | B1* | 7/2004 | Brandenberger | E21F 16/02 405/150.2 |
| 6,955,502 | B2* | 10/2005 | Warren | E21D 11/38 405/150.2 |
| 2010/0080920 | A1* | 4/2010 | Lagrange | C09D 7/61 524/80 |
| 2020/0165382 | A1 | 5/2020 | Hansel et al. | |

FOREIGN PATENT DOCUMENTS

| | | | | |
|---|---|---|---|---|
| CN | 108285523 | A | 7/2018 | |
| CN | 106368722 | B | 12/2018 | |
| CN | 110922553 | A * | 3/2020 | C08G 18/4018 |
| CN | 111777887 | A * | 10/2020 | C08G 18/12 |
| CN | 115260430 | A | 11/2022 | |
| CN | 115536801 | A * | 12/2022 | |
| JP | 2005307147 | A | 11/2005 | |

OTHER PUBLICATIONS

CN 110922553 A translation. (Year: 2020).*
CN 111777887 A translation. (Year: 2020).*
CN 107022142 A translation. (Year: 2017).*
International Search Report of PCT Patent Application No. PCT/CN2024/080096 issued on May 15, 2024.
Written Opinion of the International Searching Authority of PCT Patent Application No. PCT/CN2024/080096 issued on May 15, 2024.

\* cited by examiner

SPRAY-APPLIED POLYURETHANE INSULATION MATERIAL FOR TUNNELS IN COLD REGIONS, ITS APPLICATION, AND ITS CONSTRUCTION METHOD

TECHNICAL FIELD

The present invention relates to a spray-applied polyurethane insulation material for tunnels in cold regions, its application, and its construction method, belonging to the technical field of polyurethane materials.

BACKGROUND ART

With the rapid development of railway transportation in China, many railway tunnel projects in cold regions have been constructed on a large scale. Tunnel projects in cold regions face many complex technical issues, the main one being the frost resistance of the tunnel structure. Many existing railway tunnels in cold regions have already encountered secondary lining frost damage, leading to severe icing inside the tunnel. This requires manual ice breaking before train operations, wasting manpower and resources, and seriously affecting tunnel operation safety. In response, existing technologies typically lay rigid polyurethane foam insulation layers and fireproof boards on the inner surface of the secondary lining, or use wall-separated lining frost protection insulation structures.

However, polyurethane has many issues: the spray-applied polyurethane material used in tunnels is flammable, and if not flame-retardant, it can easily cause fires; the rigid polyurethane insulation layer used in existing technologies often has large gaps between the boards during construction, with gaps increasing towards the arch top, significantly reducing insulation effectiveness and construction efficiency; during lining, air trapped in the insulation layer can cause leakage, severely affecting insulation performance; and issues with polyurethane foaming and adhesion in low-temperature environments.

Therefore, there is a need to invent a method to enhance the performance of spray-applied polyurethane to meet the demands of tunnels in cold regions.

SUMMARY OF THE INVENTION

The objective of the present invention is to overcome the deficiencies in existing technologies and provide a spray-applied polyurethane insulation material for tunnels in cold regions, its application, and its construction method.

To achieve the above objective, the technical solution adopted by the present invention is as follows:

Technical Subject 1

A spray-applied polyurethane insulation material for tunnels in cold regions, composed of raw materials with a mass ratio of 0.8-1.2 of material A and material B;

By mass parts, material A includes 90-100 parts of polyether polyol, 90-100 parts of polyester polyol, 5-10 parts of chain extender, 1-4 parts of catalyst, 10-20 parts of flame retardant, 0.5-3 parts of water, and 1-3 parts of surfactant;

The B component is diphenylmethane diisocyanate;

The flame retardant is composed of flame retardant A and flame retardant B in a mass ratio of 10:1-2.5;

The molecular structure of flame retardant A is:

The preparation method of flame retardant B includes the following steps:
- Mixing DOPO, methacryloxypropyltrimethoxysilane, vinyltri(β-methoxyethoxy)silane, and triethylamine in a mass ratio of 5-6:1.8-2.5:1.5-2:0.1-0.15 as raw materials for standby;
- Placing the raw materials in a supercritical $CO_2$ reactor and sealing, then introducing $CO_2$ gas, with the reactor pressure at 15-16.5 MPa, adjusting the reactor temperature to 40-48° C., reacting for 4-7 hours to obtain the graft product of silane and DOPO;
- Mixing $TiO_2$ and the graft product of silane and DOPO in a mass ratio of 1.5-2.2:1, placing in a supercritical $CO_2$ reactor and sealing, then introducing $CO_2$ gas, with the reaction system temperature at 45-55° C., and the reaction system pressure at 17-19 MPa, reacting for 3-5 hours, washing the reaction product with anhydrous ethanol, and then drying to obtain flame retardant B.

The preparation method of flame retardant B includes the following steps:
- Mixing 5.8 g of DOPO, 2.1 g of methacryloxypropyltrimethoxysilane, and 1.6 g of vinyltri(β-methoxyethoxy)silane, then adding 0.12 g of triethylamine as raw materials for standby;
- Placing the raw materials in a supercritical $CO_2$ reactor and sealing, then introducing $CO_2$ gas, with the reactor pressure at 16 MPa, adjusting the reactor temperature to 45° C., reacting for 6 hours to obtain the graft product of silane and DOPO;
- Mixing 10 g of $TiO_2$ and 5 g of the obtained graft product of silane and DOPO, placing in a supercritical $CO_2$ reactor and sealing, then introducing $CO_2$ gas, with the reaction system temperature at 50° C., and the reaction system pressure at 18 MPa, reacting for 4 hours, washing the reaction product with anhydrous ethanol, and then drying to obtain flame retardant B.

The grafting rate of surface functional molecules of the obtained flame retardant B is 70%.

In some embodiments of the present invention, the polyether polyol includes polyether polyol a, polyether polyol b, and polyether polyol c in a mass ratio of 1:1:0.8-1.2;

Polyether polyol a is prepared using sucrose and sorbitol as initiators, with a functionality of 2-4, viscosity of 2500-3000 mPa·s, and hydroxyl value of 310-360 mgKOH/g;

Polyether polyol b is prepared using phenol as an initiator through a Mannich reaction, with a functionality of 4-5, viscosity of 1500-2000 mPa·s, and hydroxyl value of 270-300 mgKOH/g;

Polyether polyol c is prepared using sucrose and diethylene glycol as initiators, with a functionality of 2-4, viscosity of 2500-3000 mPa·s, and hydroxyl value of 310-360 mgKOH/g;

In some embodiments of the present invention, the polyester polyol includes polyester polyol a and b in a mass ratio of 1:0.9-1.3;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is selected from one or more of diethylene glycol, trimethylolpropane, pentaerythritol, and 1,4-butanediol; the dicarboxylic acid is phthalic anhydride;

Polyester polyol b is a carbon dioxide-based polyol, with a viscosity of 2000-3000 mPa·s, hydroxyl value of 300-400 mgKOH/g, and functionality of 2.

In some embodiments of the present invention, the surfactant is an organosilicon surfactant AK 8806 and AK 8810 in a mass ratio of 1:0.5-0.8.

In some embodiments of the present invention, the chain extender is 1,4-butanediol and pentaerythritol in a mass ratio of 1:0.3-0.5.

In some embodiments of the present invention, the catalyst is selected from one or more of stannous octoate, dibutyltin dilaurate, triethylenediamine, triethanolamine, rhodium chloride, and strontium chloride.

Technical Subject 2

The present invention provides the application of the above-mentioned spray-applied polyurethane insulation material for tunnels in cold regions, used to construct tunnel structures;

The tunnel structure is composed of, from outside to inside, tunnel rock wall, primary shotcrete layer, geotextile layer, self-adhesive waterproof board layer, spray-applied polyurethane foam layer, and secondary lining concrete layer; the spray-applied polyurethane insulation material for tunnels in cold regions is sprayed on the surface of the self-adhesive waterproof board to form the spray-applied polyurethane foam layer.

In some embodiments of the present invention, the thickness of the primary shotcrete layer in the tunnel structure is 100-280 mm; the thickness of the self-adhesive waterproof board layer is 1-1.5 mm; the thickness of the spray-applied polyurethane foam layer is 50-70 mm; the thickness of the secondary lining concrete layer is 400-600 mm.

In some embodiments of the present invention, the construction method of the tunnel structure includes the following steps:

Setting a grid steel frame on the tunnel rock wall, spraying concrete to embed the grid steel frame in the shotcrete, forming an integral structure with the concrete, and forming the primary shotcrete layer;

Fixing the geotextile to the primary shotcrete layer through steel nails in a penetrating manner, forming the geotextile layer; the distance between adjacent steel nails is 45-55 cm; the overlapping width between adjacent geotextile layers is 100-120 mm, and the overlapping parts are bonded through high-temperature hot melt with a hot air gun;

Adhering the self-adhesive waterproof board to the surface of the geotextile; bonding the self-adhesive waterproof board layer to the geotextile layer through several self-adhesive tapes, and fixing the bonding parts with expansion screws, overlapping adjacent self-adhesive waterproof board layers; welding the overlapping parts with double seam hot melt welding;

Spraying the spray-applied polyurethane insulation material for tunnels in cold regions on the surface of the self-adhesive waterproof board, forming the spray-applied polyurethane foam layer;

Pouring lining concrete on the surface of the spray-applied polyurethane foam layer, forming the secondary lining concrete layer.

In some embodiments of the present invention, the spraying method of the spray-applied polyurethane insulation material for tunnels in cold regions includes the following steps: construction is carried out when the on-site temperature is higher than −10° C.; the foaming time is 1-2 s, and curing is 25-40 s; for the first two layers, each layer is sprayed with a thickness of 5-10 mm, after the second layer, each layer is sprayed with 20-30 mm; the spraying speed is 1-2 kg/min; the spray gun moving speed is 0.5 m/s; after the first and second layers are sprayed, a layer of polyurethane waterproof coating is sprayed on the surface of the polyurethane foam.

The beneficial effects produced by adopting the above technical solution are as follows:

The spray-applied polyurethane insulation material for tunnels in cold regions provided by the present invention, formed by compounding various polyether polyols and polyester polyols into a combined polyether, can make the mixed system have good fluidity, good mutual solubility of material A, material B, and other additives, excellent foam size stability. The use of flame retardant A and flame retardant B in material A, in a synergistic manner, improves the flame retardant performance of the spray-applied polyurethane and also enhances the insulation performance of the polyurethane.

The spray-applied polyurethane insulation material for tunnels in cold regions provided by the present invention has been verified to have a density of ≥45 kg/m$^3$, cell diameter of 10 um-50 um, closed-cell rate of up to 99.9%, flame retardant grade of B1, smoke production grade of S1, smoke toxicity grade of t0, and thermal conductivity of 0.020-0.022 W/(m·K).

The construction method for the tunnel structure provided by the present invention not only ensures the reasonable arrangement of the layers of the structure but also utilizes the waterproof and insulation performance characteristics of the geotextile layer, self-adhesive waterproof board layer, and spray-applied polyurethane foam layer, ensuring tight layer-by-layer adhesion, maximally preventing the ingress of air and water, reducing the damage caused by frost heave of infiltrated water, and preventing the surface of the overall structure from bulging.

DRAWINGS

To more clearly illustrate the specific embodiments of the present invention or the technical solutions in the prior art, the drawings required for the description of the specific embodiments or the prior art will be briefly introduced below. It is evident that the following drawings are some embodiments of the present invention. For those skilled in the art, other drawings can also be obtained based on these drawings without creative efforts.

Wherein: 1 is the tunnel rock wall, 2 is the primary shotcrete layer, 3 is the geotextile layer, 4 is the self-adhesive waterproof board layer, 5 is the spray-applied polyurethane foam layer, 6 is the secondary lining concrete layer, 7 is the grid steel frame, 8 is the steel nail, 9 is the self-adhesive tape, 10 is the expansion screw.

DETAILED DESCRIPTION OF THE EMBODIMENTS

To make the objectives, technical solutions, and advantages of the present invention clearer, the invention will be described in detail and comprehensively in conjunction with specific embodiments below.

In the following embodiments and comparative examples:

Polyether polyol a is prepared using sucrose and sorbitol as initiators, with a functionality of 2-4, viscosity of 2500-3000 mPa·s, and hydroxyl value of 310-360 mgKOH/g, purchased from Shandong Bluestar Dongda Co., Ltd.

Polyether polyol b is prepared using phenol as an initiator through a Mannich reaction, with a functionality of 4-5, viscosity of 1500-2000 mPa·s, and hydroxyl value of 270-300 mgKOH/g, purchased from Shandong Bluestar Dongda Co., Ltd.

Polyether polyol c is prepared using sucrose and diethylene glycol as initiators, with a functionality of 2-4, viscosity of 2500-3000 mPa·s, and hydroxyl value of 310-360 mgKOH/g, purchased from Shandong Bluestar Dongda Co., Ltd.

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the dicarboxylic acid is phthalic anhydride; purchased from Zhangjiagang Nangang Chemical Co., Ltd.

Polyester polyol b is a carbon dioxide-based polyol, with a viscosity of 2000-3000 mPa·s, hydroxyl value of 300-400 mgKOH/g, and functionality of 2, purchased from the Changchun Institute of Applied Chemistry, Chinese Academy of Sciences.

AK 8806 organosilicon surfactant is purchased from Jiangsu Maysta Chemical Co., Ltd.

AK 8810 organosilicon surfactant is purchased from Jiangsu Maysta Chemical Co., Ltd.

The mix proportions for the primary shotcrete are as follows:

| Water consumption kg/m³ | Rubber material quantity kg/m³ | Cement kg/m³ | Cement category | Composite admixture | Sand rate % | Water reducing agent | Alkali-free accelerating |
|---|---|---|---|---|---|---|---|
| 190 | 500 | 400 | PO 42.5 | 20% | 62% | 0.84% | 7.0% |

The mix proportions for the secondary lining concrete are as follows:

| Water consumption kg/m³ | Rubber material quantity kg/m³ | Cementk kg/m³ | Cement category | Composite admixture (kg) | Sand rate % | Water reducing agent |
|---|---|---|---|---|---|---|
| 220 | 550 | 360 | PO 42.5 | 210 | 62% | 0.4% |

The flame retardant A is purchased from Beijing Institute of Architectural Engineering Co., Ltd.

Example 1

A spray-applied polyurethane insulation material for tunnels in cold regions, composed of raw materials with a mass ratio of 1:1.2 of material A and material B; by mass parts, material A includes 90 parts of polyether polyol, 100 parts of polyester polyol, 5 parts of chain extender, 4 parts of catalyst, 10 parts of flame retardant, 3 parts of water, and 1 part of surfactant;

The B component is diphenylmethane diisocyanate;

The polyether polyol includes polyether polyol a, polyether polyol b, and polyether polyol c in a mass ratio of 1:1:1.2;

The polyester polyol includes polyester polyol a and b in a mass ratio of 1:0.9;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol, trimethylolpropane, and pentaerythritol in a mass ratio of 1:1:1; the dicarboxylic acid is phthalic anhydride;

The chain extender is 1,4-butanediol and pentaerythritol in a mass ratio of 1:0.5;

The catalyst is a mixture of stannous octoate, dibutyltin dilaurate, and triethylenediamine in a mass ratio of 1:1:1;

The flame retardant is composed of flame retardant A and flame retardant B in a mass ratio of 10:1;

The preparation method of flame retardant B includes the following steps: placing 5.0 g of DOPO, 2.5 g of methacryloxypropyltrimethoxysilane, and 1.5 g of vinyltri(β-methoxyethoxy)silane in a petri dish, mixing, then adding 0.15 g of triethylamine to the petri dish as raw materials for standby;

Placing the petri dish with the raw materials in a supercritical $CO_2$ reactor and sealing, then introducing $CO_2$ gas, with the reactor pressure at 15 MPa, adjusting the reactor temperature to 48° C., reacting for 4 hours to obtain the graft product of silane and DOPO;

Mixing 7.5 g of $TiO_2$ and 5 g of the obtained graft product of silane and DOPO in a petri dish, placing in a supercritical $CO_2$ reactor and sealing, then introducing $CO_2$ gas, with the reaction system temperature at 55° C., and the reaction system pressure at 17 MPa, reacting for 5 hours, taking out the reaction product and placing it on a filter cake, washing with anhydrous ethanol 3 times; then air-drying in a fume hood, and transferring to a 90° C. vacuum oven for drying for 24 hours to obtain flame retardant B.

The surfactant is AK 8806 and AK 8810 organosilicon surfactants in a mass ratio of 1:0.8.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Example 2

A spray-applied polyurethane insulation material for tunnels in cold regions, composed of raw materials with a mass ratio of 0.8 of material A and material B; by mass parts, material A includes 100 parts of polyether polyol, 90 parts of polyester polyol, 10 parts of chain extender, 1 part of catalyst, 20 parts of flame retardant, 0.5 parts of water, and 3 parts of surfactant;

The B component is diphenylmethane diisocyanate;

The polyether polyol includes polyether polyol a, polyether polyol b, and polyether polyol c in a mass ratio of 1:1:0.8;

The polyester polyol includes polyester polyol a and b in a mass ratio of 1:1.3;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is pentaerythritol; the dicarboxylic acid is phthalic anhydride;

The chain extender is 1,4-butanediol and pentaerythritol in a mass ratio of 1:0.5;

The catalyst is a mixture of triethanolamine and dibutyltin dilaurate in a mass ratio of 1:1;

The flame retardant is composed of flame retardant A and flame retardant B in a mass ratio of 10:1;

The preparation method of flame retardant B includes the following steps: placing 6.0 g of DOPO, 1.8 g of methacryloxypropyltrimethoxysilane, and 1.5 g of vinyltri(β-methoxyethoxy)silane in a petri dish, mixing, then adding 0.10 g of triethylamine to the petri dish as raw materials for standby;

Placing the petri dish with the raw materials in a supercritical $CO_2$ reactor and sealing, then introducing $CO_2$ gas, with the reactor pressure at 16.5 MPa, adjusting the reactor temperature to 40° C., reacting for 7 hours to obtain the graft product of silane and DOPO;

Mixing 11 g of $TiO_2$ and 5 g of the obtained graft product of silane and DOPO in a petri dish, placing in a supercritical $CO_2$ reactor and sealing, then introducing $CO_2$ gas, with the reaction system temperature at 45° C., and the reaction system pressure at 19 MPa, reacting for 3 hours, taking out the reaction product and placing it on a filter cake, washing with anhydrous ethanol 3 times; then air-drying in a fume hood, and transferring to a 90° C. vacuum oven for drying for 24 hours to obtain flame retardant B.

The surfactant is AK 8806 and AK 8810 organosilicon surfactants in a mass ratio of 1:0.8.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Example 3

Figure 1:
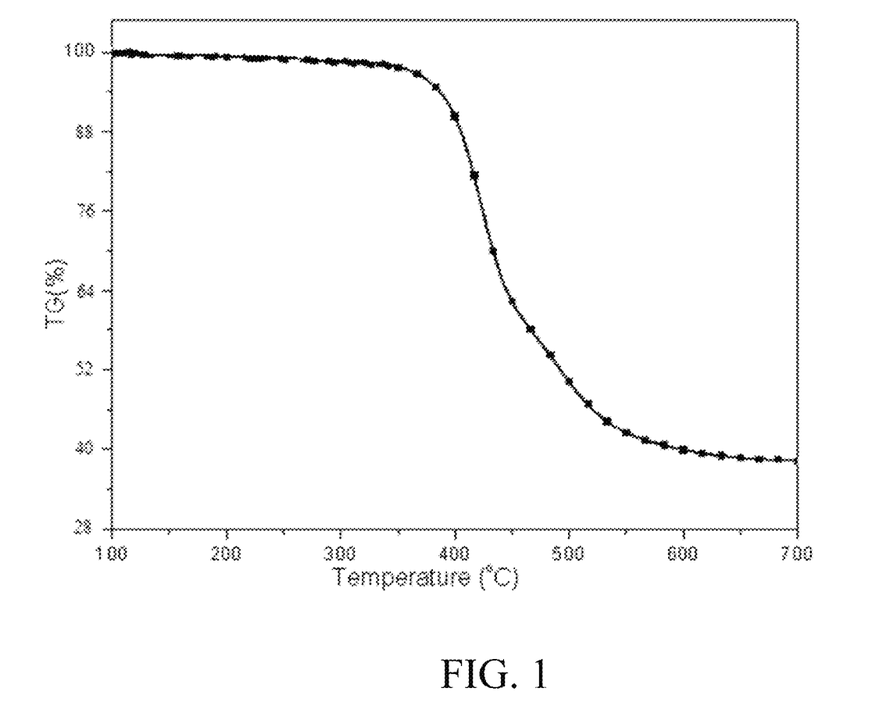
FIG. 1 is the thermogravimetric analysis diagram of flame retardant B in Example 3 of the present invention.

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;

The B component is diphenylmethane diisocyanate;

The polyether polyol includes polyether polyol a, polyether polyol b, and polyether polyol c in a mass ratio of 1:1:1;

The polyester polyol includes polyester polyol a and b in a mass ratio of 1:1;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;

The chain extender is 1,4-butanediol and pentaerythritol in a mass ratio of 1:0.3-0.5;

The catalyst is a mixture of rhodium chloride and strontium chloride in a mass ratio of 1:1;

The flame retardant is composed of flame retardant A and flame retardant B in a mass ratio of 10:1.5;

The preparation method of flame retardant B includes the following steps:

Placing 5.8 g of DOPO, 2.1 g of methacryloxypropyltrimethoxysilane, and 1.6 g of vinyltri(β-methoxyethoxy)silane in a petri dish, mixing, then adding 0.12 g of triethylamine to the petri dish as raw materials for standby;

Placing the petri dish with the raw materials in a supercritical $CO_2$ reactor and sealing, then introducing $CO_2$ gas, with the reactor pressure at 16 MPa, adjusting the reactor temperature to 45° C., reacting for 6 hours to obtain the graft product of silane and DOPO;

Mixing 10 g of $TiO_2$ and 5 g of the obtained graft product of silane and DOPO in a petri dish, placing in a supercritical $CO_2$ reactor and sealing, then introducing $CO_2$ gas, with the reaction system temperature at 50° C., and the reaction system pressure at 18 MPa, reacting for 4 hours, taking out the reaction product and placing it on a filter cake, washing with anhydrous ethanol 3 times; then air-drying in a fume hood, and transferring to a 90° C. vacuum oven for drying for 24 hours to obtain flame retardant B. The grafting rate of surface functional molecules of the obtained flame retardant B is 70%, as shown in FIG. 1, which is the thermogravimetric analysis diagram of flame retardant B;

The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Example 4

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;

The B component is diphenylmethane diisocyanate;

The polyether polyol includes polyether polyol a, polyether polyol b, and polyether polyol c in a mass ratio of 1:1:1;

The polyester polyol includes polyester polyol a and b in a mass ratio of 1:1;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;

The chain extender is 1,4-butanediol and pentaerythritol in a mass ratio of 1:0.3-0.5;

The catalyst is rhodium chloride;

The flame retardant is composed of flame retardant A and flame retardant B in a mass ratio of 10:1.5;

The preparation method of flame retardant B includes the following steps:

Placing 5.8 g of DOPO, 2.1 g of methacryloxypropyltrimethoxysilane, and 1.6 g of vinyltri(β-methoxyethoxy)silane in a petri dish, mixing, then adding 0.12 g of triethylamine to the petri dish as raw materials for standby;

Placing the petri dish with the raw materials in a supercritical $CO_2$ reactor and sealing, then introducing $CO_2$ gas, with the reactor pressure at 16 MPa, adjusting the reactor temperature to 45° C., reacting for 6 hours to obtain the graft product of silane and DOPO;

Mixing 10 g of $TiO_2$ and 5 g of the obtained graft product of silane and DOPO in a petri dish, placing in a supercritical $CO_2$ reactor and sealing, then introducing $CO_2$ gas, with the reaction system temperature at 50° C., and the reaction system pressure at 18 MPa, reacting for 4 hours, taking out the reaction product and placing it on a filter cake, washing with anhydrous ethanol 3 times; then air-drying in a fume hood, and transferring to a 90° C. vacuum oven for drying for 24 hours to obtain flame retardant B. The grafting rate of surface functional molecules of the obtained flame retardant B is 70%;

The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Example 5

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;

The B component is diphenylmethane diisocyanate;

The polyether polyol includes polyether polyol a, polyether polyol b, and polyether polyol c in a mass ratio of 1:1:1;

The polyester polyol includes polyester polyol a and b in a mass ratio of 1:1;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;

The chain extender is 1,4-butanediol and pentaerythritol in a mass ratio of 1:0.3-0.5;

The catalyst is strontium chloride;

The flame retardant is composed of flame retardant A and flame retardant B in a mass ratio of 10:1.5;

The preparation method of flame retardant B includes the following steps:

Placing 5.8 g of DOPO, 2.1 g of methacryloxypropyltrimethoxysilane, and 1.6 g of vinyltri(β-methoxyethoxy)silane in a petri dish, mixing, then adding 0.12 g of triethylamine to the petri dish as raw materials for standby;

Placing the petri dish with the raw materials in a supercritical $CO_2$ reactor and sealing, then introducing $CO_2$ gas, with the reactor pressure at 16 MPa, adjusting the reactor temperature to 45° C., reacting for 6 hours to obtain the graft product of silane and DOPO;

Mixing 10 g of $TiO_2$ and 5 g of the obtained graft product of silane and DOPO in a petri dish, placing in a supercritical $CO_2$ reactor and sealing, then introducing $CO_2$ gas, with the reaction system temperature at 50° C., and the reaction system pressure at 18 MPa, reacting for 4 hours, taking out the reaction product and placing it on a filter cake, washing with anhydrous ethanol 3 times; then air-drying in a fume hood, and transferring to a 90° C. vacuum oven for drying for 24 hours to obtain flame retardant B. The grafting rate of surface functional molecules of the obtained flame retardant B is 70%;

The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 1

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;
The B component is diphenylmethane diisocyanate;
The polyether polyol includes polyether polyol a, polyether polyol b, and polyether polyol c in a mass ratio of 1:1:1;
The polyester polyol includes polyester polyol a and b in a mass ratio of 1:1;
Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;
The chain extender is 1,4-butanediol and pentaerythritol in a mass ratio of 1:0.3-0.5;
The catalyst is a mixture of rhodium chloride and strontium chloride in a mass ratio of 1:1;
The flame retardant is flame retardant A;
The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 2

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;
The B component is diphenylmethane diisocyanate;
The polyether polyol includes polyether polyol a, polyether polyol b, and polyether polyol c in a mass ratio of 1:1:1;
The polyester polyol includes polyester polyol a and b in a mass ratio of 1:1;
Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;
The chain extender is 1,4-butanediol and pentaerythritol in a mass ratio of 1:0.3-0.5;
The catalyst is a mixture of rhodium chloride and strontium chloride in a mass ratio of 1:1;
The flame retardant is the same flame retardant B used in Example 3;
The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 3

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 2 parts of water, and 2 parts of surfactant;
The B component is diphenylmethane diisocyanate;
The polyether polyol includes polyether polyol a, polyether polyol b, and polyether polyol c in a mass ratio of 1:1:1;
The polyester polyol includes polyester polyol a and b in a mass ratio of 1:1;
Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;
The chain extender is 1,4-butanediol and pentaerythritol in a mass ratio of 1:0.3-0.5;
The catalyst is a mixture of rhodium chloride and strontium chloride in a mass ratio of 1:1;
The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 4

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;
The B component is diphenylmethane diisocyanate;
The polyether polyol includes polyether polyol a, polyether polyol b, and polyether polyol c in a mass ratio of 1:1:1;

The polyester polyol includes polyester polyol a and b in a mass ratio of 1:1;
Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;
The chain extender is 1,4-butanediol and pentaerythritol in a mass ratio of 1:0.3-0.5;
The catalyst is a mixture of rhodium chloride and strontium chloride in a mass ratio of 1:1;
The flame retardant is composed of flame retardant A and flame retardant B in a mass ratio of 10:0.9; the flame retardant B is the same as used in Example 3;
The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 5

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;
The B component is diphenylmethane diisocyanate;
The polyether polyol includes polyether polyol a, polyether polyol b, and polyether polyol c in a mass ratio of 1:1:1;
The polyester polyol includes polyester polyol a and b in a mass ratio of 1:1;
Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;
The chain extender is 1,4-butanediol and pentaerythritol in a mass ratio of 1:0.3-0.5;
The catalyst is a mixture of rhodium chloride and strontium chloride in a mass ratio of 1:1;
The flame retardant is composed of flame retardant A and flame retardant B in a mass ratio of 10:2.6; the flame retardant B is the same as used in Example 3;
The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 6

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;
The B component is diphenylmethane diisocyanate;
The polyether polyol includes polyether polyol a, polyether polyol b, and polyether polyol c in a mass ratio of 1:1:1;
The polyester polyol includes polyester polyol a and b in a mass ratio of 1:1;
Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;
The chain extender is 1,4-butanediol and pentaerythritol in a mass ratio of 1:0.3-0.5;
The catalyst is a mixture of rhodium chloride and strontium chloride in a mass ratio of 1:1;
The flame retardant is composed of flame retardant A and flame retardant B in a mass ratio of 10:1.5; the preparation method of flame retardant A is as follows:
Adding 218 g (1 mol) of pyromellitic dianhydride, 212 g (2 mol) of diethylene glycol, and 0.43 g of potassium fluorotitanate sequentially into a four-neck flask, slowly heating to 120-140° C. Stopping the reaction when the acid value of the product is ≤1.5 mg KOH/g; cooling to below 90° C. and filtering to obtain pyromellitic polyester polyol.
2) Adding 120 g of the obtained pyromellitic polyester polyol and 120 g of phosphorus trichloride into a reaction flask, reacting at 70° C. for 3 hours, then heating to 100° C. and maintaining for 4 hours, cooling, filtering, washing, and drying to obtain pyromellitic flame retardant polyester polyol;
Adding 400 g of pyromellitic polyester polyol and 0.04 g of dimethylamine into a polyether reactor, reducing pressure, gradually adding 400 g of propylene oxide into the reactor, slowly heating to 120° C. with an internal pressure of 0.2 MPa, reacting at this temperature and pressure for 3 hours, then vacuuming, cooling to below 90° C., and filtering to obtain flame retardant A.
The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 7

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;

The B component is diphenylmethane diisocyanate;

The polyether polyol includes polyether polyol a, polyether polyol b, and polyether polyol c in a mass ratio of 1:1:1;

The polyester polyol includes polyester polyol a and b in a mass ratio of 1:1;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;

The chain extender is 1,4-butanediol and pentaerythritol in a mass ratio of 1:0.3-0.5;

The catalyst is a mixture of rhodium chloride and strontium chloride in a mass ratio of 1:1;

The flame retardant is composed of flame retardant A and flame retardant B in a mass ratio of 10:1.5;

The preparation method of flame retardant B includes the following steps:

Placing 5.8 g of DOPO, 3.7 g of vinyltri(β-methoxyethoxy)silane in a petri dish, mixing, then adding 0.12 g of triethylamine to the petri dish as raw materials for standby;

Placing the petri dish with the raw materials in a supercritical $CO_2$ reactor and sealing, then introducing $CO_2$ gas, with the reactor pressure at 16 MPa, adjusting the reactor temperature to 45° C., reacting for 6 hours to obtain the graft product of silane and DOPO;

Mixing 10 g of $TiO_2$ and 5 g of the obtained graft product of silane and DOPO in a petri dish, placing in a supercritical $CO_2$ reactor and sealing, then introducing $CO_2$ gas, with the reaction system temperature at 50° C., and the reaction system pressure at 18 MPa, reacting for 4 hours, taking out the reaction product and placing it on a filter cake, washing with anhydrous ethanol 3 times; then air-drying in a fume hood, and transferring to a 90° C. vacuum oven for drying for 24 hours to obtain flame retardant B;

The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Comparative Example 8

A spray-applied polyurethane insulation material for tunnels in cold regions, composed of raw materials with a mass ratio of 1:1 of material A and material B; by mass parts, material A includes 95 parts of polyether polyol, 95 parts of polyester polyol, 8 parts of chain extender, 3 parts of catalyst, 15 parts of flame retardant, 2 parts of water, and 2 parts of surfactant;

The B component is diphenylmethane diisocyanate;

The polyether polyol includes polyether polyol a, polyether polyol b, and polyether polyol c in a mass ratio of 1:1:1;

The polyester polyol includes polyester polyol a and b in a mass ratio of 1:1;

Polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is a mixture of diethylene glycol and trimethylolpropane in a mass ratio of 1:1; the dicarboxylic acid is phthalic anhydride;

The chain extender is 1,4-butanediol and pentaerythritol in a mass ratio of 1:0.3-0.5;

The catalyst is a mixture of rhodium chloride and strontium chloride in a mass ratio of 1:1;

The flame retardant is composed of flame retardant A and flame retardant B in a mass ratio of 10:1.5;

The preparation method of flame retardant B includes the following steps:

Placing 5.8 g of DOPO, 3.7 g of methacryloxypropyltrimethoxysilane in a petri dish, mixing, then adding 0.12 g of triethylamine to the petri dish as raw materials for standby;

Placing the petri dish with the raw materials in a supercritical $CO_2$ reactor and sealing, then introducing $CO_2$ gas, with the reactor pressure at 16 MPa, adjusting the reactor temperature to 45° C., reacting for 6 hours to obtain the graft product of silane and DOPO;

Mixing 10 g of $TiO_2$ and 5 g of the obtained graft product of silane and DOPO in a petri dish, placing in a supercritical $CO_2$ reactor and sealing, then introducing $CO_2$ gas, with the reaction system temperature at 50° C., and the reaction system pressure at 18 MPa, reacting for 4 hours, taking out the reaction product and placing it on a filter cake, washing with anhydrous ethanol 3 times; then air-drying in a fume hood, and transferring to a 90° C. vacuum oven for drying for 24 hours to obtain flame retardant B;

The surfactant is AK 8806 and AK 8810 organosilicon surfactants in a mass ratio of 1:0.6.

Using a two-component high-pressure spray foaming machine for foaming, controlling the temperature of material A and material B at 25±5° C., setting the pipeline temperature of the high-pressure foaming machine to 40° C., and atomizing and reacting material A and material B from the high-pressure gun head to form spray-applied polyurethane foam.

Performance Testing

Performance tests were conducted on the spray-applied polyurethane insulation materials for tunnels in cold regions from Examples 1-5 and Comparative Examples 1-8. The performance tests were based on the following standards:

Testing density according to GB/T6343-2009;

Testing compressive strength according to GB/T8813-2008;

Testing oxygen index according to GB/T2406.2-2009;

Testing closed-cell rate according to GB/T 10799-1989;

Testing dimensional stability according to GB/T8811-2008;

Testing thermal conductivity according to GB/T10294-2008;

Testing cell diameter, flame retardant grade, smoke production grade, and smoke toxicity grade according to GB 8624-2012.

The results are shown in Tables 1-2:

TABLE 1

| Sample | Example1 | Example2 | Example3 | Example 4 | Example 5 |
|---|---|---|---|---|---|
| Closed-cell rate % | 98.9 | 99.1 | 99.9 | 99.0 | 98.6 |
| Cell diameter um | 50 | 30 | 10 | 23 | 24 |
| Density kg/m$^3$ | 45 | 48 | 46 | 48 | 47 |
| Dimensional stability (−30° C., 48 h) % | −0.3 | −0.3 | −0.2 | −0.2 | −0.2 |
| Thermal conductivity W/(m · K) | 0.022 | 0.022 | 0.020 | 0.021 | 0.022 |
| Compressive strength kPa | 157 | 156 | 160 | 152 | 154 |
| Flame retardant grade | B1 | B1 | B1 | B1 | B1 |
| Smoke production grade | S1 | S1 | S1 | S1 | S1 |
| Smoke toxicity grade | t0 | t0 | t0 | t0 | t0 |

TABLE 2

| Sample | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Closed-cell rate % | 94.1 | 93.4 | 90.5 | 97.6 | 97.2 | 96.8 | 97.8 | 98.1 |
| Cell diameter um | 90 | 97 | 100 | 84 | 85 | 92 | 74 | 72 |
| Density kg/m$^3$ | 46 | 45 | 48 | 47 | 48 | 46 | 47 | 46 |
| Dimensional stability (−30° C., 48 h) % | −0.5 | −0.5 | −0.6 | −0.5 | −0.6 | −0.5 | −0.4 | −0.3 |
| Thermal conductivity W/(m · K) | 0.25 | 0.024 | 0.030 | 0.026 | 0.028 | 0.025 | 0.025 | 0.026 |
| Compressive strength kPa | 146 | 144 | 140 | 147 | 145 | 147 | 150 | 150 |
| Flame retardant grade | B2 | B2 | B2 | B2 | B2 | B1 | B1 | B1 |
| Smoke production grade | S2 | S2 | S2 | S2 | S2 | S2 | S2 | S2 |
| Smoke toxicity grade | t1 | t1 | t1 | t1 | t1 | t1 | t1 | t1 |

Application Example 1

Figure 2:
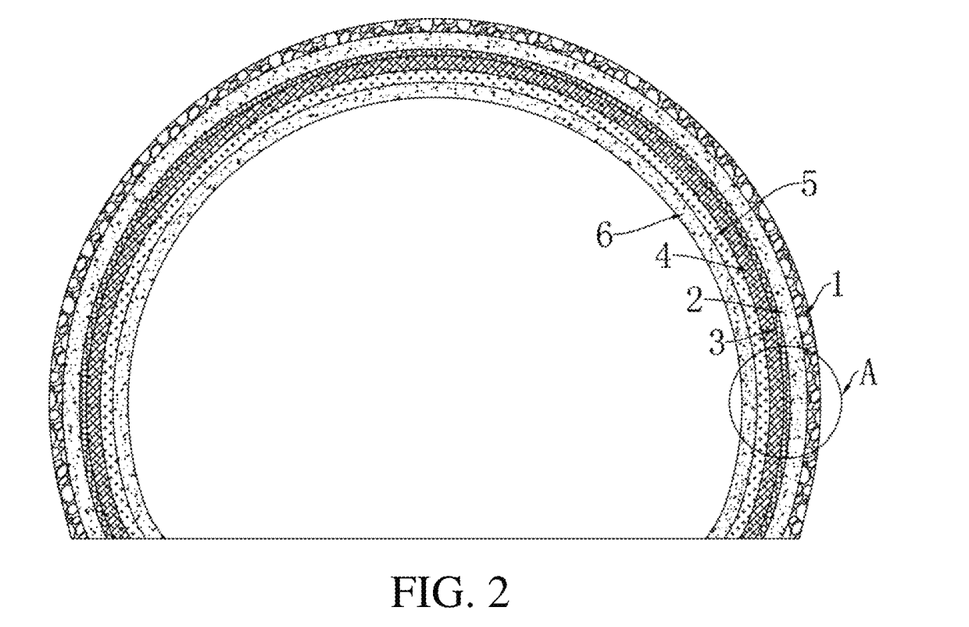
FIG. 2 is a schematic diagram of the tunnel structure with spray-applied polyurethane insulation material for cold regions as the insulation layer in Application Example 1 of the present invention.

As shown in FIG. 2, a tunnel structure with spray-applied polyurethane as the insulation layer for cold regions is composed of, from outside to inside, tunnel rock wall, primary shotcrete layer, geotextile layer, self-adhesive waterproof board layer, spray-applied polyurethane foam layer, and secondary lining concrete layer; the spray-applied polyurethane insulation material for tunnels in cold regions is sprayed on the surface of the self-adhesive waterproof board to form the spray-applied polyurethane foam layer; the thickness of the primary shotcrete layer is 100-280 mm; the thickness of the self-adhesive waterproof board layer is 1-1.5 mm; the thickness of the spray-applied polyurethane foam layer is 50-70 mm; the thickness of the secondary lining concrete layer is 400-600 mm.

The construction method for the tunnel structure with spray-applied polyurethane insulation material for cold regions as the insulation layer includes the following steps:

Setting a grid steel frame on the tunnel rock wall, spraying concrete to embed the grid steel frame in the shotcrete, forming an integral structure with the concrete, and forming the primary shotcrete layer;

Fixing the geotextile to the primary shotcrete layer through steel nails in a penetrating manner, forming the geotextile layer; the distance between adjacent steel nails is 45-55 cm; the overlapping width between adjacent geotextile layers is 100-120 mm, and the overlapping parts are bonded through high-temperature hot melt with a hot air gun;

Using a special laying and hanging trolley to lay the waterproof board along the tunnel contour, adhering the self-adhesive waterproof board to the surface of the geotextile; bonding the self-adhesive waterproof board layer to the geotextile layer through several self-adhesive tapes, and fixing the bonding parts with expansion screws, overlapping adjacent self-adhesive waterproof board layers; welding the overlapping parts with double seam hot melt welding; the waterproof board should be laid from bottom to top, welded with an electric plastic welding gun and hot melt gaskets; the waterproof board is welded with a self-climbing hot welding machine, and after laying, the welds and welding points should be inspected to check the impermeability of the welds, and to observe for any burn damage, and repair if necessary;

Spraying the spray-applied polyurethane insulation material for tunnels in cold regions on the surface of the self-adhesive waterproof board, forming the spray-applied polyurethane foam layer; the spraying method of the spray-applied polyurethane insulation material for tunnels in cold regions includes the following steps: construction is carried out when the on-site temperature is higher than −10° C.; the foaming time is about 1-2 s, and curing is 25-40 s; for the first two layers, each layer is sprayed with a thickness of 5-10 mm, after the second layer, each layer is sprayed with 20-30 mm; the spraying speed is 1-2 kg/min; the spray gun moving speed is 0.5 m/s; after the first and second layers are sprayed, a layer of polyurethane waterproof coating is sprayed on the surface of the polyurethane foam. If the polyurethane waterproof coating is not added, the expected service life of the structure is 100 years; if the waterproof coating is added, the expected service life of the structure is 120 years.

Pouring lining concrete on the surface of the spray-applied polyurethane foam layer, forming the secondary lining concrete layer.

Figure 3:
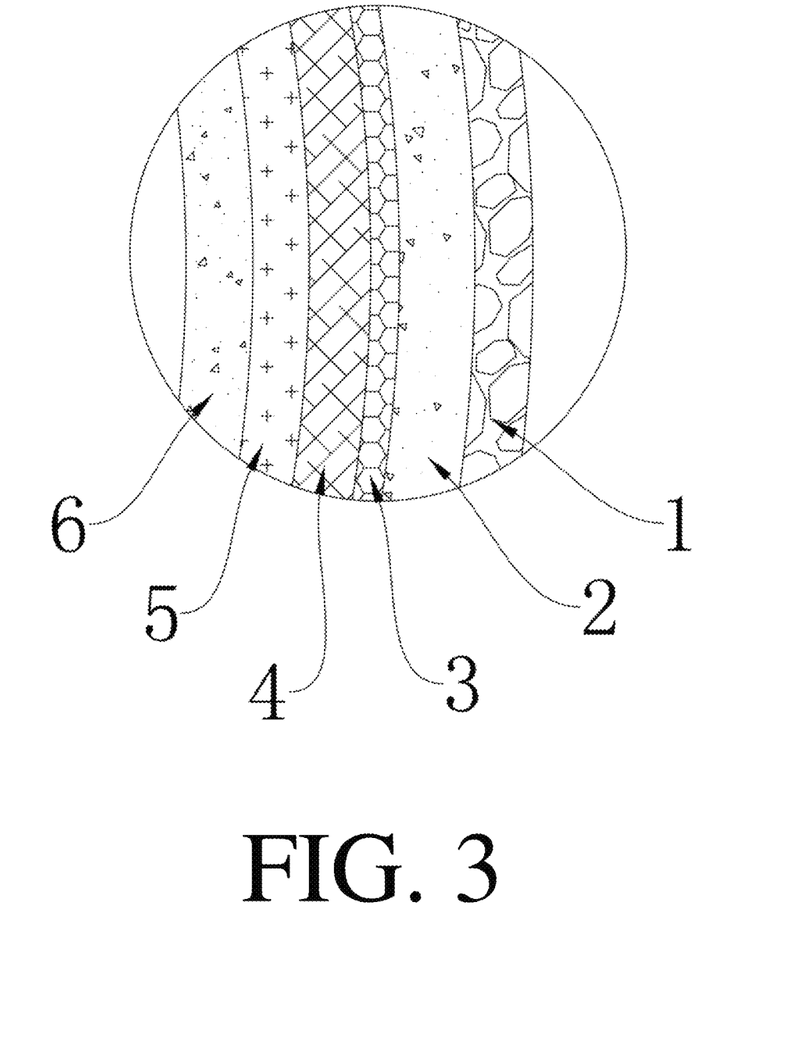
FIG. 3 is a schematic diagram of the partial structure A of the tunnel structure with spray-applied polyurethane insulation material for cold regions as the insulation layer in FIG. 2.
Figure 4:
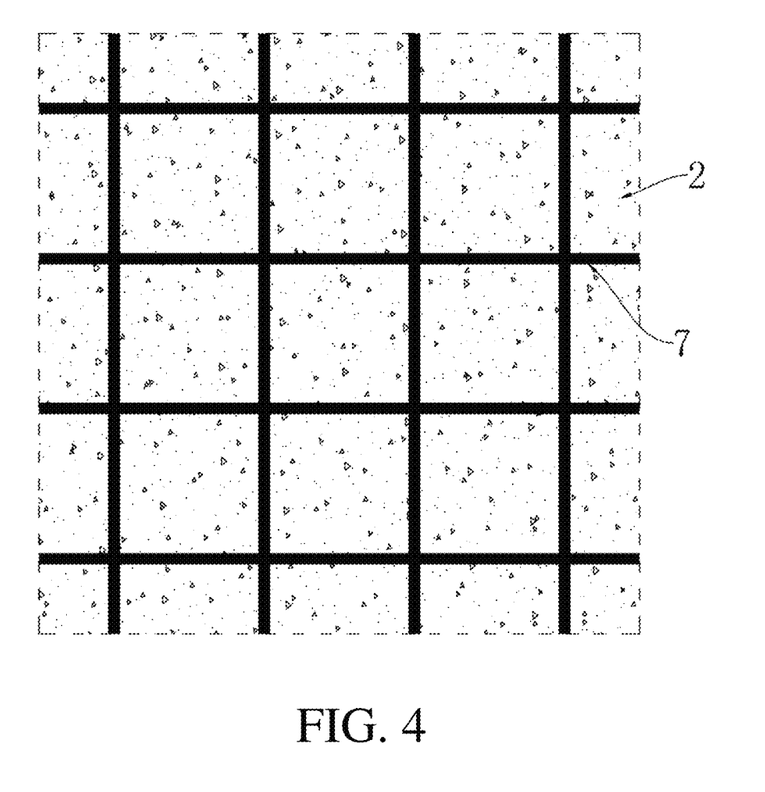
FIG. 4 is a schematic diagram of the grid steel frame embedded in the primary shotcrete layer in partial structure A.

As shown in FIG. 3, the primary shotcrete layer fully covers the tunnel rock wall, with a spraying thickness of 100-280 mm. As shown in FIG. 4, the grid steel frame is embedded within the primary shotcrete layer. The grid steel frame easily integrates with the primary shotcrete layer, making it difficult for seepage channels to form on the contact surface, thereby improving the durability and frost resistance of the initial support. Additionally, the primary shotcrete layer serves as the tunnel lining, providing both support and fire protection. The primary shotcrete layer is used to fill and level the uneven areas of the tunnel rock wall, flattening protruding edges such as the grid steel frame to make the base surface relatively smooth, preventing puncturing of the geotextile layer and the self-adhesive waterproof board layer, thereby maintaining waterproof and insulation performance.

Figure 5:
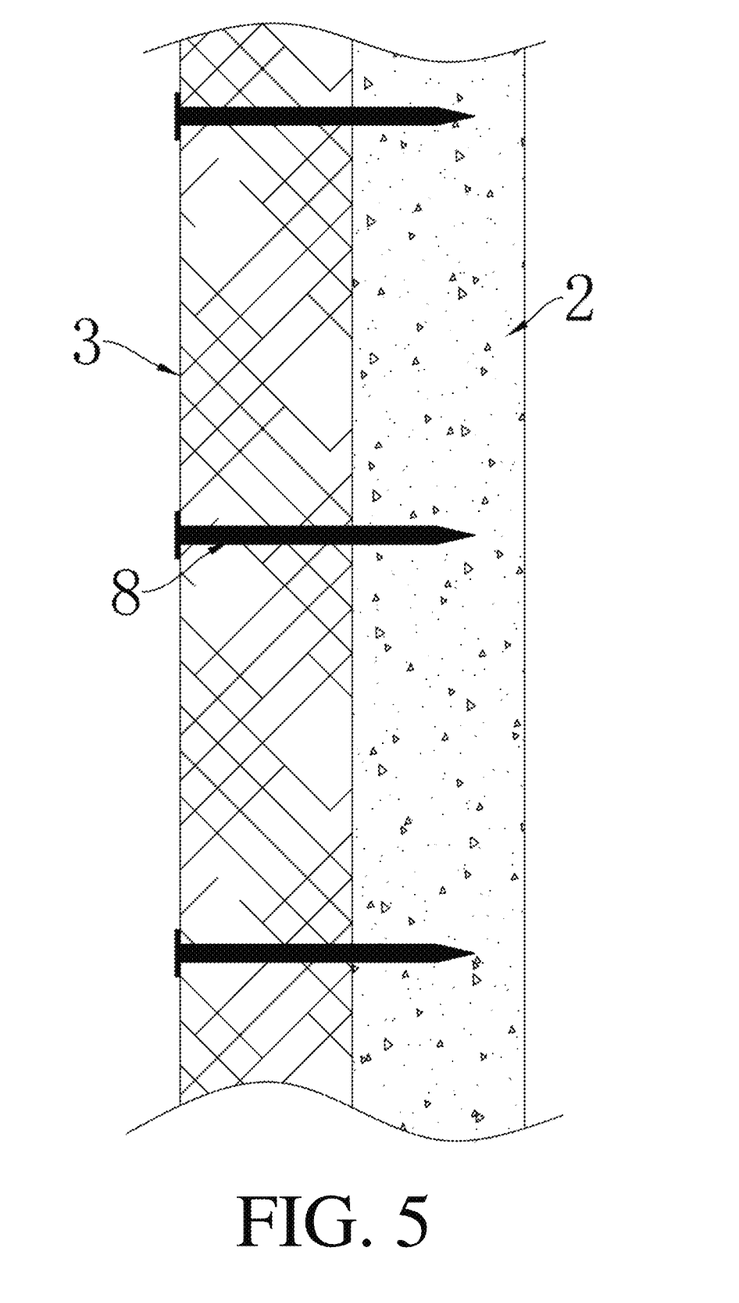
FIG. 5 is a schematic diagram of the geotextile layer fixed to the primary shotcrete layer with steel nails in partial structure A.

As shown in FIG. 5, the geotextile layer is fixed to the primary shotcrete layer through steel nails in a penetrating manner, with the distance between adjacent steel nails being 50 cm; the overlapping width between adjacent geotextile layers is 100-120 mm, and the overlapping parts are bonded through high-temperature hot melt with a hot air gun. Specifically, a hot air gun is used to instantly heat the connection points of the two pieces of fabric to a molten state, and then a certain amount of external force is immediately applied to firmly bond them together. The connection method between the geotextile layer and the primary shotcrete layer ensures the smoothness of the geotextile layer, making them tightly adhere to each other. The geotextile layer isolates the primary shotcrete layer from the self-adhesive waterproof board layer, maintaining the overall structure and function of both, enhancing the load-bearing capacity, and improving the tensile strength and deformation resistance of the primary shotcrete layer, thereby enhancing its stability. The geotextile layer has good water drainage performance, allowing excess liquid and gas within the primary shotcrete layer structure to be discharged. Meanwhile, the self-adhesive waterproof board layer effectively blocks excess liquid and gas from eroding the spray-applied polyurethane foam layer, preventing a decline in its insulation performance, and further preventing frost heave interactions and deterioration between the tunnel rock wall, primary shotcrete layer, and secondary lining concrete layer. Additionally, the geotextile layer prevents the uneven surface of the primary shotcrete layer from affecting the self-adhesive waterproof board layer and is resistant to high temperatures, freezing, aging, corrosion, and insect damage.

Figure 6:
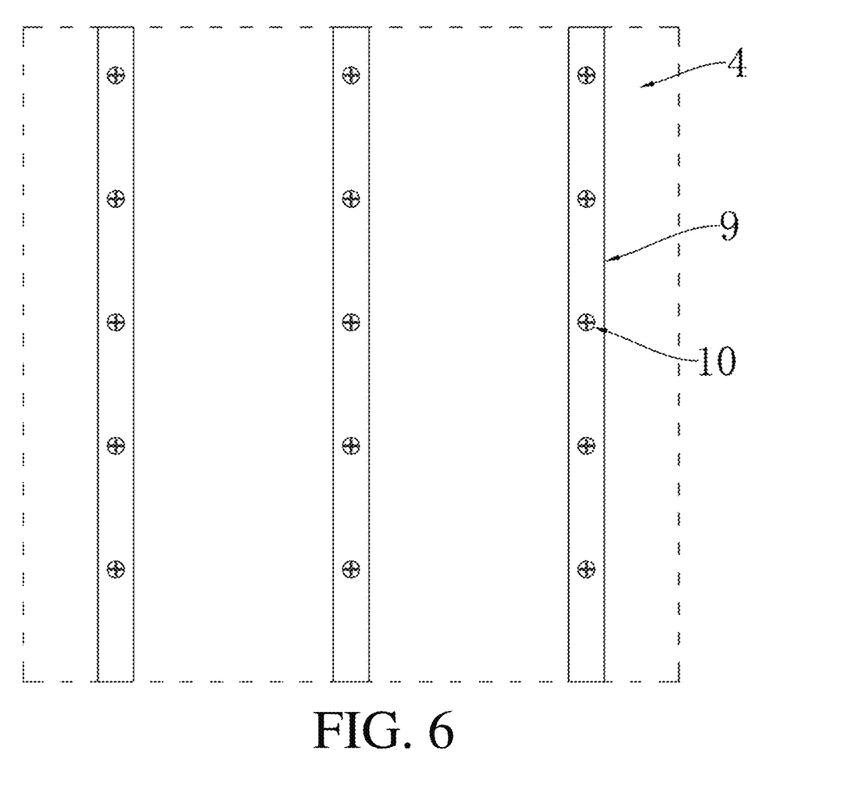
FIG. 6 is a schematic diagram of the connection between the self-adhesive waterproof board layer and the geotextile layer in partial structure A.

As shown in FIG. 6, one side of the self-adhesive waterproof board layer is connected with several self-adhesive tapes through hot melt adhesive. The self-adhesive waterproof board layer is bonded to the geotextile layer through several self-adhesive tapes and fixed at the bonding points with expansion screws. The thickness of the self-adhesive waterproof board layer is 1-1.5 mm; adjacent self-adhesive waterproof board layers are connected by welding, with an overlapping width of 100-120 mm. The self-adhesive waterproof board layer tightly adheres to the surface of the geotextile layer, achieving a non-bulging effect and the best insulation performance. The self-adhesive tapes further ensure that the self-adhesive waterproof board layer fully adheres to the geotextile layer and the surface of the primary shotcrete, preventing air ingress and providing excellent insulation performance.

The interfaces between the tunnel rock wall, primary shotcrete layer, and secondary lining concrete layer are prone to freeze-thaw expansion and contraction of water vapor, which can cause repeated loading and forced deformation of the overall structure. The geotextile layer, self-adhesive waterproof board layer, and spray-applied polyurethane foam layer, placed between the primary shotcrete layer and the secondary lining concrete layer, provide support to reduce the frost heave force of infiltrated water on the secondary lining concrete layer. This better insulates the tunnel rock, adapting to the special climatic conditions of cold regions, reducing freeze-thaw damage to the structure behind the primary shotcrete layer and secondary lining concrete layer, and improving the safety and stability of tunnel operations in cold regions.

The spray-applied polyurethane foam layer is sprayed onto the surface of the self-adhesive waterproof board layer, with a spraying thickness of 50-70 mm. The secondary lining concrete layer is poured onto the surface of the spray-applied polyurethane foam layer, with a thickness of 400-600 mm.

Both the primary shotcrete layer and the secondary lining concrete layer are conventional concrete. The secondary lining concrete layer is used to bear part of the load and prevent cold air inside the tunnel from freezing the tunnel rock.

During the initial shotcrete process, the I-beams and H-beams in the initial support are mostly semi-enclosed space structures. The shotcrete not only has difficulty forming a complete and dense bond with them, but the contact surface also easily forms seepage channels, reducing the durability of the initial support. However, the present invention uses a grid steel frame that easily integrates with the concrete, so the initial support using a grid steel frame has relatively better frost resistance.

The root cause of "bulging" is the incomplete adhesion between the surface of the initial support and the waterproof board. The present invention uses a special laying and hanging trolley to lay the waterproof board along the tunnel contour, then injects bonding materials into the concave and convex surfaces between the waterproof board and the initial support surface, making the waterproof board tightly adhere to the initial support surface, achieving a non-bulging effect and the best insulation performance.

Application Comparative Example 1

Figure 7:
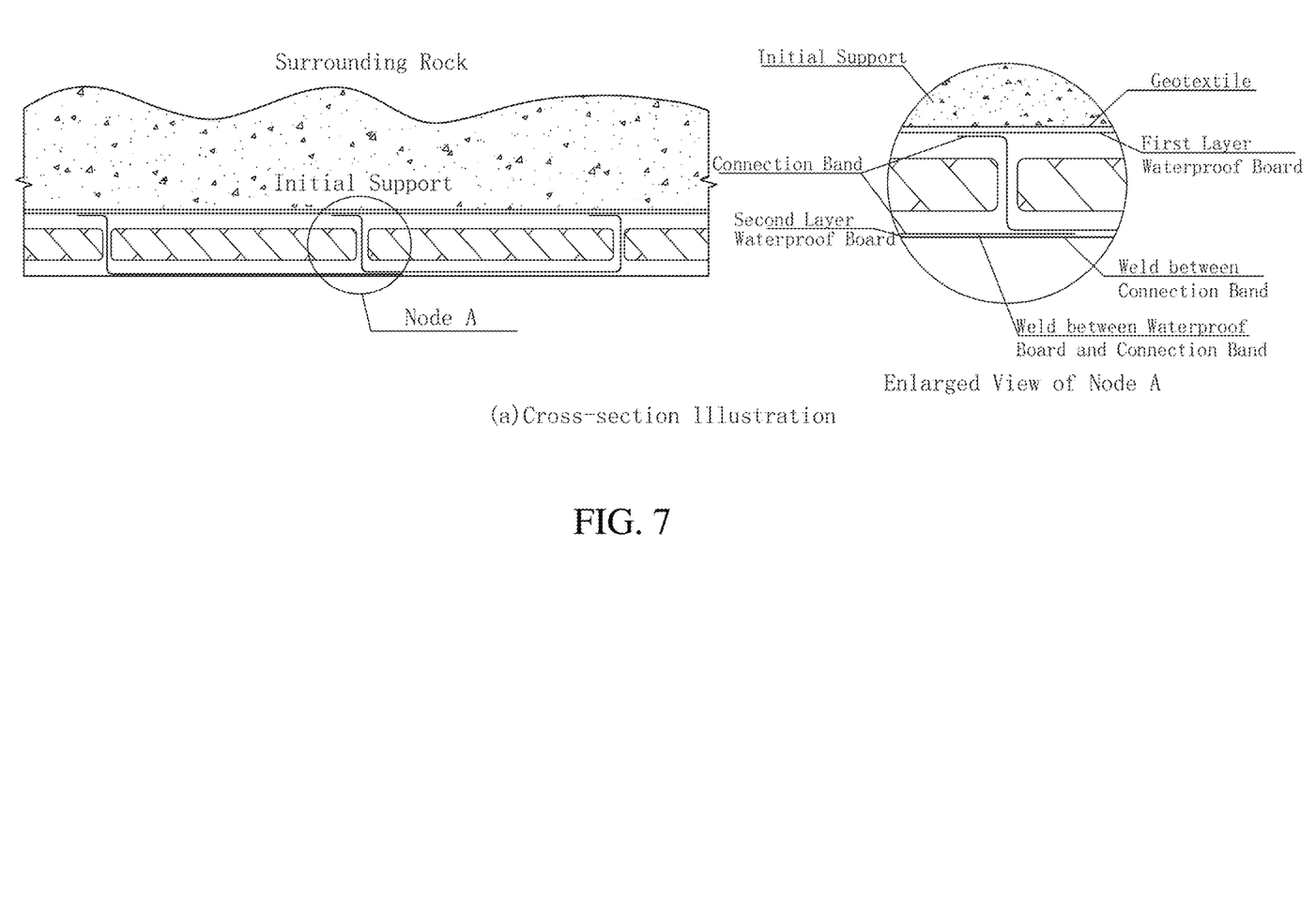
FIG. 7 is a schematic diagram of the tunnel structure in Comparative Example 1.

As shown in FIG. 7, using a double-layer waterproof board+insulation board method, this method results in large gaps between the boards during construction, with gaps increasing towards the arch top, significantly reducing insulation effectiveness and construction efficiency.

Application Comparative Example 2

As disclosed in the patent with application number CN201611110975.5, the structure is complicated and cannot completely isolate air. In contrast, the spray-applied polyurethane foam of the present invention forms a completely sealed structure after foaming, providing better insulation performance than Application Comparative Example 2.

Application Comparative Example 3

The spraying method of the spray-applied polyurethane insulation material for tunnels in cold regions includes the following steps: construction is carried out when the on-site temperature is higher than −10° C.; the foaming time is about 1-2 s, and curing is 25-40 s; each layer is sprayed with a thickness of 20-30 mm; the spraying speed is 1-2 kg/min; the spray gun moving speed is 0.5 m/s. This spraying method generates a lot of heat, causing the waterproof board to bulge; especially when the thickness of the first two layers exceeds 10 mm, the polyurethane insulation material easily falls off.

Finally, it should be noted that the above embodiments are only used to illustrate the technical solutions of the present invention and not to limit them; although the present invention has been described in detail with reference to the above embodiments, those skilled in the art should understand that they can still make modifications to the technical solutions described in the above embodiments, or make equivalent replacements for some of the technical features; these modifications or replacements do not depart from the spirit and scope of the technical solutions of the embodiments of the present invention.

The invention claimed is:

1. A method for construction of tunnels in cold regions using a spray-applied polyurethane insulation material, wherein the method comprises:
forming a tunnel structure comprising, from outside to inside, a tunnel rock wall, a primary shotcrete layer, a geotextile layer, a self-adhesive waterproof board layer, a spray-applied polyurethane foam layer, and a secondary lining concrete layer, wherein the spray-applied polyurethane foam layer is formed by spraying the spray-applied polyurethane insulation material on a surface of the self-adhesive waterproof board layer,
wherein the spray-applied polyurethane insulation material
comprises a material A and a material B in a mass ratio of 0.8-1.2;
by mass parts, the material A includes 90-100 parts of polyether polyol, 90-100 parts of polyester polyol, 5-10 parts of chain extender, 1-4 parts of catalyst, 10-20 parts of flame retardant, 0.5-3 parts of water, and 1-3 parts of surfactant;

the material B is diphenylmethane diisocyanate;

the flame retardant comprises a flame retardant A and a flame retardant B in a mass ratio of 10:1-2.5;

the molecular structure of the flame retardant A is:

wherein the flame retardant B is prepared by
mixing DOPO, methacryloxypropyltrimethoxysilane, vinyltri(β-methoxyethoxy) silane, and triethylamine in a mass ratio of 5-6:1.8-2.5:1.5-2:0.1-0.15 as raw materials for standby;
placing the raw materials in a supercritical $CO_2$ reactor and sealing, then introducing $CO_2$ gas, with the reactor pressure at 15-16.5 MPa, adjusting the reactor temperature to 40-48° C., reacting for 4-7 hours to obtain the graft product of silane and DOPO; and
mixing $TiO_2$ and the graft product of silane and DOPO in a mass ratio of 1.5-2.2:1, placing in a supercritical $CO_2$ reactor and sealing, then introducing $CO_2$ gas, with the reaction system temperature at 45-55° C., and the reaction system pressure at 17-19 MPa, reacting for 3-5 hours, washing the reaction product with anhydrous ethanol, and then drying to obtain the flame retardant B.

2. The method for construction of tunnels in cold regions according to claim 1, wherein the thickness of the primary shotcrete layer in the tunnel structure is 100-280 mm; the thickness of the self-adhesive waterproof board layer is 1-1.5 mm; the thickness of the spray-applied polyurethane foam layer is 50-70 mm; and the thickness of the secondary lining concrete layer is 400-600 mm.

3. The method for construction of tunnels in cold regions according to claim 1, wherein forming the tunnel structure comprises:
setting a grid steel frame on the tunnel rock wall, spraying concrete to embed the grid steel frame in the shotcrete, forming an integral structure with the concrete, and forming the primary shotcrete layer;
fixing the geotextile to the primary shotcrete layer through steel nails in a penetrating manner, forming the geotextile layer; overlapping adjacent geotextile layers, and bonding the overlapping parts through high-temperature hot melt with a hot air gun;
adhering the self-adhesive waterproof board to the surface of the geotextile; bonding the self-adhesive waterproof board layer to the geotextile layer through several self-adhesive tapes, and fixing the bonding parts with expansion screws, overlapping adjacent self-adhesive waterproof board layers; welding the overlapping parts with double seam hot melt welding;
spraying the spray-applied polyurethane insulation material for tunnels in cold regions on the surface of the self-adhesive waterproof board, forming the spray-applied polyurethane foam layer; and pouring lining concrete on the surface of the spray-applied polyurethane foam layer, forming the secondary lining concrete layer.

4. The method for construction of tunnels in cold regions according to claim 3, wherein spraying the spray-applied polyurethane insulation material for tunnels in cold regions includes the following steps: construction is carried out when the on-site temperature is higher than −10° C.; the foaming time is about 1-2 s, and curing is 25-40 s; for the first two layers, each layer is sprayed with a thickness of 3-5 mm, after the second layer, each layer is sprayed with 20-30 mm; the spraying speed is 1-2 kg/min; the spray gun moving speed is 0.5 m/s; after the first and second layers are sprayed, a layer of polyurethane waterproof coating is sprayed on the surface of the polyurethane foam.

5. The method for construction of tunnels in cold regions according to claim 1, wherein the polyether polyol includes a polyether polyol a, a polyether polyol b, and a polyether polyol c in a mass ratio of 1:1:0.8-1.2;

wherein the polyether polyol a is prepared using sucrose and sorbitol as initiators, with a functionality of 2-4, viscosity of 2500-3000 mPa·s, and hydroxyl value of 310-360 mgKOH/g;

wherein the polyether polyol b is prepared using phenol as an initiator through a Mannich reaction, with a functionality of 4-5, viscosity of 1500-2000 mPa·s, and hydroxyl value of 270-300 mgKOH/g; and wherein the polyether polyol c is prepared using sucrose and diethylene glycol as initiators, with a functionality of 2-4, viscosity of 2500-3000 mPa·s, and hydroxyl value of 310-360 mgKOH/g.

6. The method for construction of tunnels in cold regions according to claim 1, wherein the polyester polyol includes a polyester polyol a and a polyester polyol b in a mass ratio of 1:0.9-1.3;

wherein the polyester polyol a is a polycondensation product obtained by reacting polyol and dicarboxylic acid at 140-200° C., with a functionality of 2, viscosity of 9000-15000 mPa·s, and hydroxyl value of 500-600 mgKOH/g; the polyol is selected from one or more of diethylene glycol, trimethylolpropane, pentaerythritol, and 1,4-butanediol; the dicarboxylic acid is phthalic anhydride; and wherein the polyester polyol b is a carbon dioxide-based polyol, with a viscosity of 2000-3000 mPa·s, hydroxyl value of 300-400 mgKOH/g, and functionality of 2.

7. The method for construction of tunnels in cold regions according to claim 1, wherein the surfactant is an organosilicon surfactant AK 8806 and AK 8810 in a mass ratio of 1:0.5-0.8.

8. The method for construction of tunnels in cold regions according to claim 1, wherein the chain extender is 1,4-butanediol and pentaerythritol in a mass ratio of 1:0.3-0.5.

9. The method for construction of tunnels in cold regions according to claim 1, wherein the catalyst is selected from one or more of stannous octoate, dibutyltin dilaurate, triethylenediamine, triethanolamine, rhodium chloride, and strontium chloride.

\* \* \* \* \*